Feb. 15, 1966   R. T. FAUCETTE, JR   3,235,281
PARTIALLY ASSEMBLED WHEELBARROW
Filed Aug. 25, 1965

INVENTOR
Robert T. Faucette, Jr.
BY
ATTORNEY

United States Patent Office 3,235,281
Patented Feb. 15, 1966

3,235,281
PARTIALLY ASSEMBLED WHEELBARROW
Robert T. Faucette, Jr., 1200 Wisdom St.,
Chattanooga, Tenn.
Filed Aug. 25, 1965, Ser. No. 482,353
1 Claim. (Cl. 280—47.31)

This invention relates to a wheelbarrow and more particularly to a wheelbarrow which includes frame members secured together by tubular fasteners to facilitate completion of assembly by attachment of a tray, leg and wheel. This application is a continuation-in-part of my application Serial No. 332,711, filed December 23, 1963.

In the manufacture and distribution of manufactured products such as wheelbarrows, it is more economical with respect to freight charges and storage space to ship such products in knocked-down condition, i.e., unassembled. On the other hand, when it is necessary for a dealer or customer to put together many parts, much time is required for such assembly and the cost of the labor needed to perform the assembly is excessive. It is thus highly desirable partially to assemble manufactured products prior to shipment in order to take advantage of savings in shipping charges and in storage space resulting from having compact articles occupying minimum volume and of minimum labor charges incurred in completing the assembly of the products. How to accomplish these two aims has been a problem to many manufacturers which has been difficult to solve and for which completely satisfactory solutions have not been achieved, at least in many fields.

Accordingly, one object of my invention is to provide a means for partially assembling a product for shipment in compact form.

Another object is to provide a means for assembling partially a manufactured product for shipment in a way that permits rapid completion of the assembly by the consignee.

Figure 1:
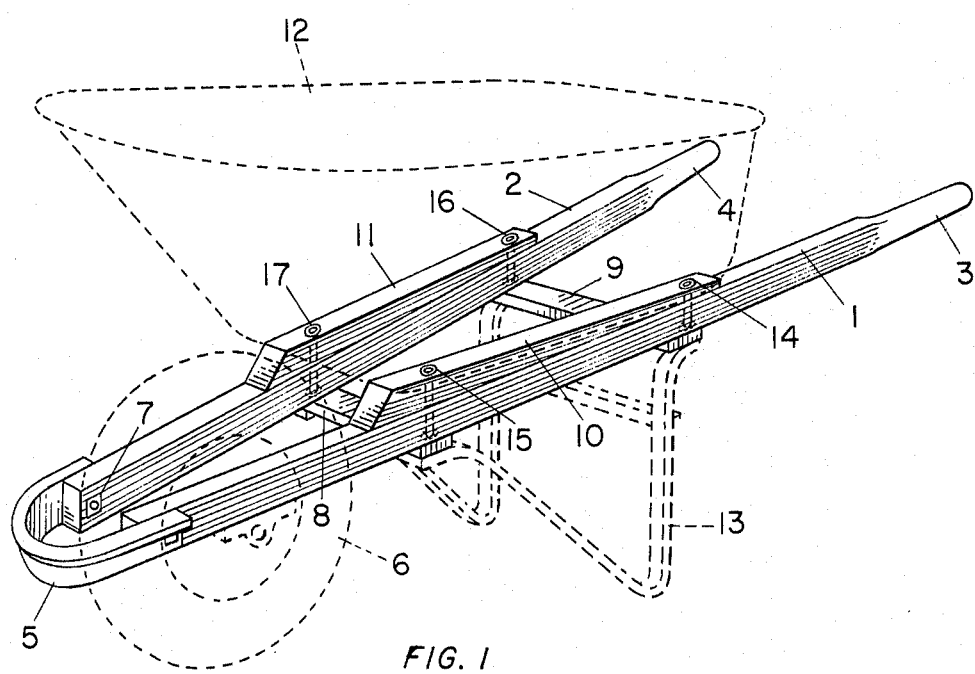
Figure 2:
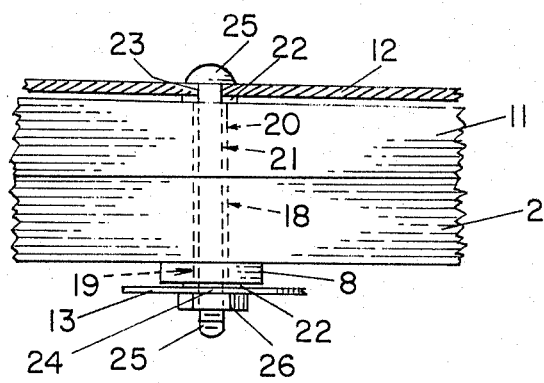

Other objects and advantages of the invention will be apparent from the following description, taken in conjunction with the accompanying drawings, in which:

FIG. 1 is a perspective view of one embodiment of a wheelbarrow made in accordance with this invention, the pan, leg and wheel being shown in broken lines for clarity of illustration; and FIG. 2 is an enlarged partial side elevation, partly in section, showing clearly the manner in which the pan, leg and frame members are secured together by bolts.

In the drawings, there are shown a pair of substantially longitudinal handle shafts 1 and 2 having handles 3 and 4 at their rear ends and converging toward each other. At their front ends, the shafts 1 and 2 are joined by a U-shaped channel member 5 forming a partial enclosure for a wheel 6 and attached to the shafts by bolts 7. To the lower sides of the handle shafts are attached a front transverse stay member 8 and a rear transverse stay member 9 in a manner to be described. To the upper surfaces of the handle shafts are attached tray riser blocks 10 and 11 which are inclined planes supporting at a desired inclination in use a tray 12. Suitable legs 13 support the wheelbarrow when it is not in motion. The channel member, the tray and the legs are ordinarily made of steel, the wheel is ordinarily of steel with a pneumatic rubber tire and the other parts mentioned heretofore are usually made of wood, although other materials may be used for these parts. The handle shafts 1 and 2, the transverse stay members 8 and 9 and the tray riser blocks 10 and 11 are secured together at a plurality of points, four such points 14, 15, 16 and 17 being shown in the drawings.

As illustrated in FIG. 2, each of the handle shafts 1 and 2 has an opening 18 extending substantially vertically therethrough, the transverse stay members 8 and 9 have similar openings 19 therethrough and the tray riser blocks 10 and 11 have similar openings 20 therethrough. These openings 18, 19 and 20 are so formed as to be in alignment or registry with each other in sets and through each is passed a tubular fastener 21. The ends of each fastener are flared, as indicated at 22, to bind the transverse stay members 8 and 9 and the tray riser blocks 10 and 11, with the handle shafts 1 and 2 between them. In this manner, the wheelbarrow frame is partially assembled and, at the same time, occupies a minimum volume for shipment and storage, thus incurring a minimum shipping charge and requiring a minimum amount of storage space.

Openings 23 in the tray 12 and 24 in the legs 13 are provided, in registry with the openings 18, 19 and 20. Through the openings 23 and 24 and the tubular fasteners 21 are passed bolts 25 on which are secured nuts 26, thereby holding the parts of the wheelbarrow together.

The legs, wheel, axle, axle brackets, axle bracket screws and bolts for attachment of the tray and legs are assembled in one compact package, a number of which packages can be assembled for shipment and storage in a minimum volume. The trays are stacked separately in nests and thus occupy a minimum volume, also.

Upon receipt of the shipment, the consignee has a very simple job in completing the assembly. The tray 12 is put into position on top of the tray riser blocks 10 and 11, four bolts 25 are passed through holes 23 in the tray, through the tubular fasteners 21 in the sets of openings 14, 15, 16 and 17 and through the openings 24 in the legs 13. The nuts 26 are then tightened onto the bolts and the assembly is complete, except for the wheel 6. It is quickly installed by passing the axle through it and fastening the axle in place to the lower surfaces of the handle shafts 1 and 2 by means of brackets and screws, not shown.

By this invention, the several parts of a wheelbarrow frame are secured together in a single unit in such a manner that no parts need be removed or loosened when the wheelbarrow is to be completely assembled. This invention avoids the common practice of using to secure the frame parts together in shipment and storage the bolts which are to hold the tray to the frame. Thus, the difficulty encountered in the common practice, of having the frame fall aparat when the tray bolts are removed to mount the tray, is avoided. Accordingly, the time and labor charge involved in the conventional method of having two men assemble a wheelbarrow are drastically reduced. In contrast in the use of this invention, it is a simple and quick one-man job to assemble a wheelbarrow at the delivery point with simple tools because the frame remains intact during shipment.

This invention provides an economical package for shipment, a package occupying a minimum volume for storage and, at the same time, a product the complete assembly of which can be accomplished much more quickly and easily than any similar product heretofore known.

It will be apparent to those skilled in the art that various changes may be made in the invention, without departing from the spirit and scope thereof, and therefore the invention is not limited by that which is shown in the drawings and described in the specification, but only as indicated in the appended claim.

I claim:
A wheelbarrow comprising
a pair of longitudinal handle shafts,
a front transverse stay member,
a rear transverse stay member,
a pair of tray riser blocks,
    the shafts, transverse stay members and blocks
    having a plurality of openings therethrough in
    registry with each other in sets, a tubular fastener extending through each of the sets of openings,
  each fastener being flared at its ends to hold the shafts, transverse stay members and blocks in assembled relationship,
a tray and leg members having openings in registry with the tubular fasteners, and
a bolt passing through each tubular member and through the aligned openings in the tray and legs to secure the members together.

References Cited by the Examiner

UNITED STATES PATENTS

| 1,526,935 | 2/1925 | Roemer | 280—47.31 |
| 2,271,488 | 1/1942 | Nold. | |

BENJAMIN HERSH, *Primary Examiner.*

J. A. PEKAR, *Examiner.*